United States Patent
Kobayashi

(10) Patent No.: US 9,418,581 B2
(45) Date of Patent: Aug. 16, 2016

(54) DISPLAY DEVICE, HEAD-MOUNTED DISPLAY DEVICE, DISPLAY SYSTEM, AND CONTROL METHOD FOR DISPLAY DEVICE

(71) Applicant: Seiko Epson Corporation, Tokyo (JP)

(72) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

(21) Appl. No.: 14/328,065

(22) Filed: Jul. 10, 2014

(65) Prior Publication Data

US 2015/0035727 A1     Feb. 5, 2015

(30) Foreign Application Priority Data

Jul. 31, 2013   (JP) .................. 2013-158575

(51) Int. Cl.
   *G09G 3/00*    (2006.01)
   *G09G 3/34*    (2006.01)
   *G02B 27/01*   (2006.01)

(52) U.S. Cl.
   CPC .............. *G09G 3/003* (2013.01); *G02B 27/017* (2013.01); *G09G 3/3406* (2013.01); *G02B 2027/014* (2013.01); *G02B 2027/0123* (2013.01); *G02B 2027/0178* (2013.01); *G09G 2340/145* (2013.01); *G09G 2354/00* (2013.01)

(58) Field of Classification Search
   None
   See application file for complete search history.

(56) References Cited

U.S. PATENT DOCUMENTS

| 9,041,740 B2* | 5/2015 | Sugiyama ............. B60K 35/00 345/633 |
| 2012/0200592 A1* | 8/2012 | Kimura ................. G09G 3/001 345/619 |

FOREIGN PATENT DOCUMENTS

JP   2012-163637 A   8/2012

* cited by examiner

*Primary Examiner* — Kenneth B Lee, Jr.
(74) *Attorney, Agent, or Firm* — ALG Intellectual Property, LLC

(57) ABSTRACT

A transmission-type head-mounted display device which makes a user visually recognize a display image screen as a virtual image, includes: a display control unit which causes a guide image for guiding the user's line of sight to the center of the display image screen, to be displayed on the display image screen; and a display unit which displays the guide image.

11 Claims, 7 Drawing Sheets

DISPLAY DEVICE, HEAD-MOUNTED DISPLAY DEVICE, DISPLAY SYSTEM, AND CONTROL METHOD FOR DISPLAY DEVICE

BACKGROUND

1. Technical Field

The present invention relates to a transmission-type display device, a head-mounted display device, a display system and a control method for a display device for making the user visually recognize a display image screen as a virtual image.

2. Related Art

According to the related art, as a display device of this type, an optical transmission-type head-mounted display device mounted on the user's head is known (see JP-A-2012-163637). This display device is configured in such a way that the user can visually recognizes an image as a virtual image and can also directly visually recognize the exterior (real scenery).

Meanwhile, the display device of this type uses a light guide panel having a half mirror portion to make the user visually recognize a virtual image. That is, the display device is configured to reflect and guide image light to the user's eyes by the half mirror portion, thereby making the user visually recognize a display image screen as a virtual image in the user's field of vision.

However, the related-art configuration can lead to eye fatigue and sick feeling due to the user's shifting his/her line of sight out of the display image screen (half mirror portion). That is, as the user shifts his/her line of sight out of the display image screen, the line of sight shifts to a part where there is no half mirror portion of the light guide panel and therefore the user sees the exterior through that part. Consequently, the field of vision can be distorted, causing the user to feel uncomfortable and leading to eye fatigue and sick feeling. Moreover, it is also conceivable that the line of sight may shift out of the light guide panel. In such a case, moving the line of sight into and out of the light guide panel can involve repeated focusing and therefore can lead to eye fatigue and sick feeling.

SUMMARY

An advantage of some aspects of the invention is to provide a display device, a head-mounted display device, a display system and a control method for a display device that can restrain the shift of the user's line of sight out of the display image screen, to the utmost.

An aspect of the invention is directed to a transmission-type display device which makes a user visually recognize a display image screen as a virtual image, including: a display control unit which causes a guide image for guiding the user's line of sight to the center of the display image screen, to be displayed on the display image screen; and a display unit which displays the guide image.

Another aspect of the invention is directed to a transmission-type head-mounted display device which is mounted on a user's head and makes the user visually recognize a display image screen as a virtual image, including: a display control unit which causes a guide image for guiding the user's line of sight to the center of the display image screen, to be displayed on the display image screen; and a display unit which displays the guide image.

Still another aspect of the invention is directed to a transmission-type display system which makes a user visually recognize a display image screen as a virtual image, including: a display control unit which causes a guide image for guiding the user's line of sight to the center of the display image screen, to be displayed on the display image screen; and a display unit which displays the guide image.

Yet another aspect of the invention is directed to a control method for a transmission-type display device which makes a user visually recognize a display image screen as a virtual image, including: causing a guide image for guiding the user's line of sight to the center of the display image screen, to be displayed on the display image screen; and displaying the guide image.

According to these configurations, since the guide image for guiding the user's line of sight to the center of the display image screen is displayed, the shift of the user's line of sight out of the display image screen can be restrained to the utmost. This can prevent the uncomfortable feeling on the user's side and can eliminate a factor contributing to eye fatigue and sick feeling. The term "center" used here may refer to the center in vertical direction of the display image screen or may be the center in horizontal direction of the display image screen. The center may also be the center both in vertical direction and in horizontal direction.

In the display device described above, it is preferable that the display control unit causes plural image objects for calling each application and converted into perspective images having a vanishing point at the center of the display image screen by using the perspective method, to be displayed as the guide image on the display image screen.

In this case, it is preferable that the plural image objects are one of icon, menu, and reduced application window.

According to these configurations, by adding perspective to the plural image objects with a vanishing point at the center of the display image screen, it is possible to cause the plural image objects to function as concentration lines. Therefore, the user's line of sight can be guided, using the plural image objects for calling applications. It is preferable that the image objects are converted in such a way that the longitudinal direction of the image objects corresponds to the direction of depth (direction of concentration lines) so that the image objects can easily function as concentration lines. Also, it is preferable that the image objects before conversion have a substantially rectangular outer shape so that the image objects can easily function as concentration lines.

Also, it is preferable the display control unit causes plural guide lines extending toward the center from an outer edge side of the display image screen, to be displayed as the guide image on the display image screen.

According to this configuration, the user's line of sight can be guided effectively, using the plural guide lines extending toward the center from the outer edge side.

Moreover, it is preferable that the display control unit causes one of a frame-like image surrounding the center of the display image screen and a ring-shaped image surrounding the center of the display image screen, to be displayed as the guide image on the display image screen.

According to this configuration, the user's line of sight can be guided effectively, using the frame-like image or the ring-shaped image.

Furthermore, it is preferable that the display control unit causes a gradation image which becomes darker toward the center from an outer edge side of the display image screen, to be displayed as the guide image on the display image screen.

According to this configuration, since the bright-dark gradation image generates a perspective optical illusion regarding the center as the back end, the user's line of sight can be guided effectively. It should be noted that a different technique may be used to guide the user's line of sight, with a guide image that generates a perspective optical illusion regarding the center as the back end.

Also, it is preferable that the display control unit causes plural moving objects that move toward the center from an outer edge side of the display image screen, to be displayed as the guide image on the display image screen.

According to this configuration, the user's line of sight can be guided effectively, using the moving objects.

Meanwhile, it is preferable that the display control unit causes the guide image to be displayed, avoiding a predetermined area at the center of the display image screen.

According to this configuration, the user's line of sight can be guided effectively by displaying the guide image avoiding the area at the center. Also, since the area to allow a view of the exterior can be secured at the center of the field of vision, visibility of the exterior can be improved.

Also, it is preferable that the display unit includes an image light output unit which outputs image light, and a light guide unit which guides the outputted image light to the user's eyes, and that the light guide unit transmits external light and causes the external light to become incident on the user's eyes together with the image light.

According to this configuration, a transmission-type display device which has a simple configuration and is inexpensive can be provided, by using a so-called virtual image projection-type display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a display device, a head-mounted display device, a display system and a control method for a display device according to an embodiment of the invention will be described with reference to the accompanying drawings. In this embodiment, a head-mounted display device employing the display device according to the invention is illustrated. The head-mounted display device is a display device mounted on the user's head and also called HMD (head mounted display). The head-mounted display device of this embodiment is a optical transmission-type head-mounted display device (transmission-type head-mounted display device, see-through-type head-mounted display) which makes the user visually recognize an image as a virtual image and also enables direct visual recognition of the exterior (real scenery), and is in the form of spectacles (goggles).

Figure 1:
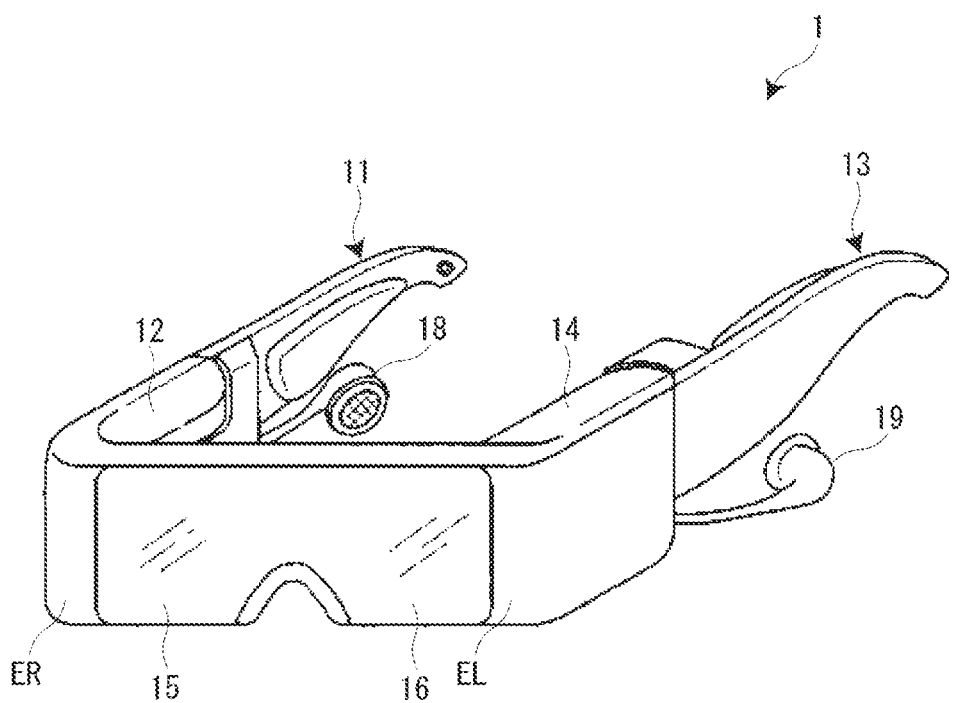
FIG. 1 is an explanatory view showing the outer configuration of a head-mounted display device according to an embodiment.

As shown in FIG. 1, a head-mounted display device 1 includes a right holding section 11, a right display drive section 12, a left holding section 13, a left display drive section 14, a right optical image display section 15, a left optical image display section 16, a right earphone 18 for right ear, and a left earphone 19 for left ear.

The right optical image display section 15 and the left optical image display section 16 are arranged at the positions corresponding to the front of the user's right and left eyes when the user wears the head-mounted display device 1. One end of the right optical image display section 15 and one end of the left optical image display section 16 are connected together at the position corresponding to the user's glabella when the user wears the head-mounted display device 1. The right holding section 11 extends from an end ER, which is the other end of the right optical image display section 15. Similarly, the left holding section 13 extends from an end EL, which is the other end of the left optical image display section 16.

The right holding section 11 is a member extending substantially at right angles to the right optical image display section 15, from the end ER of the right optical image display section 15 to the position corresponding to the user's temporal region when the user wears the head-mounted display device 1. Similarly, the left holding section 13 is a member extending substantially at right angles to the left optical image display section 16, from the end EL of the left optical image display section 16 to the position corresponding to the user's temporal region when the user wears head-mounted display device 1. The right holding section 11 and the left holding section 13 hold the head-mounted display device 1 on the user's head, like the temples (bows, earpieces) of spectacles.

The right display drive section 12 is arranged on the inner side of the right holding section 11, that is, on the side facing the user's head when the user wears the head-mounted display device 1 and on the side of the end ER of the right optical image display section 15. The left display drive section 14 is arranged on the inner side of the left holding section 13 and on the side of the end EL of the left optical image display section 16.

The right earphone 18 and the left earphone 19 are mounted on the user's right and left ears, respectively, and output various sounds to the right and left ears, when the user wears head-mounted display device 1.

Figure 2:
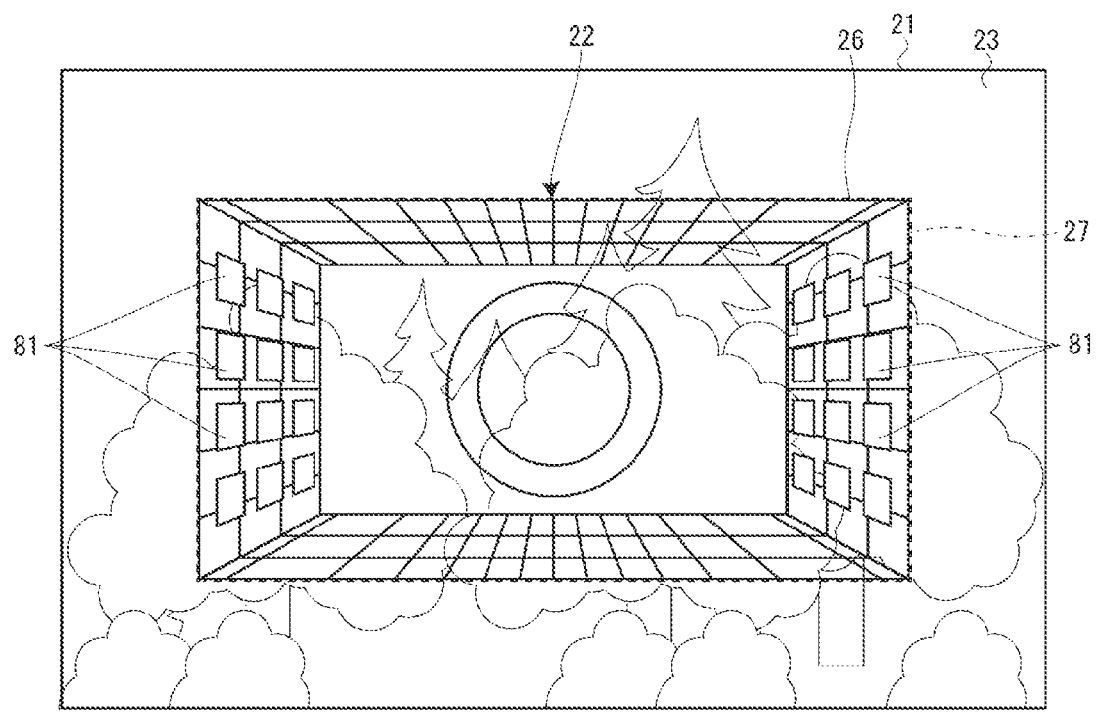
FIG. 2 illustrates an example of a virtual image and exterior that the user can visually recognize.

Next, an example of a virtual image 22 and an exterior 23 which the user wearing the head-mounted display device 1 can visually recognize will be described with reference to FIG. 2. As shown in FIG. 2, in the field of vision 21 of the user wearing the head-mounted display device 1, a display image screen 26 generated by the head-mounted display device 1 is displayed as a virtual image 22. Here, a display image screen 26 where plural icons 81 for calling each application are arranged is displayed, and the display image screen 26 is displayed in the entire range of a virtual image display area 27 where the virtual image 22 is displayed (the virtual image 22 can be displayed). As will be described in detail later, in the head-mounted display device 1, a GUI (graphical user interface) that improves visibility of the exterior 23 and guides the line of sight to the center of the display image screen 26 is realized by the display image screen 26. In the user's field of vision 21, the user can view the exterior 23 through the right optical image display section 15 and the left optical image display section 16. That is, the device is configured in such a way that the user can visually recognize the virtual image 22 and the exterior 23 at the same time within the field of vision 21.

Figure 3:
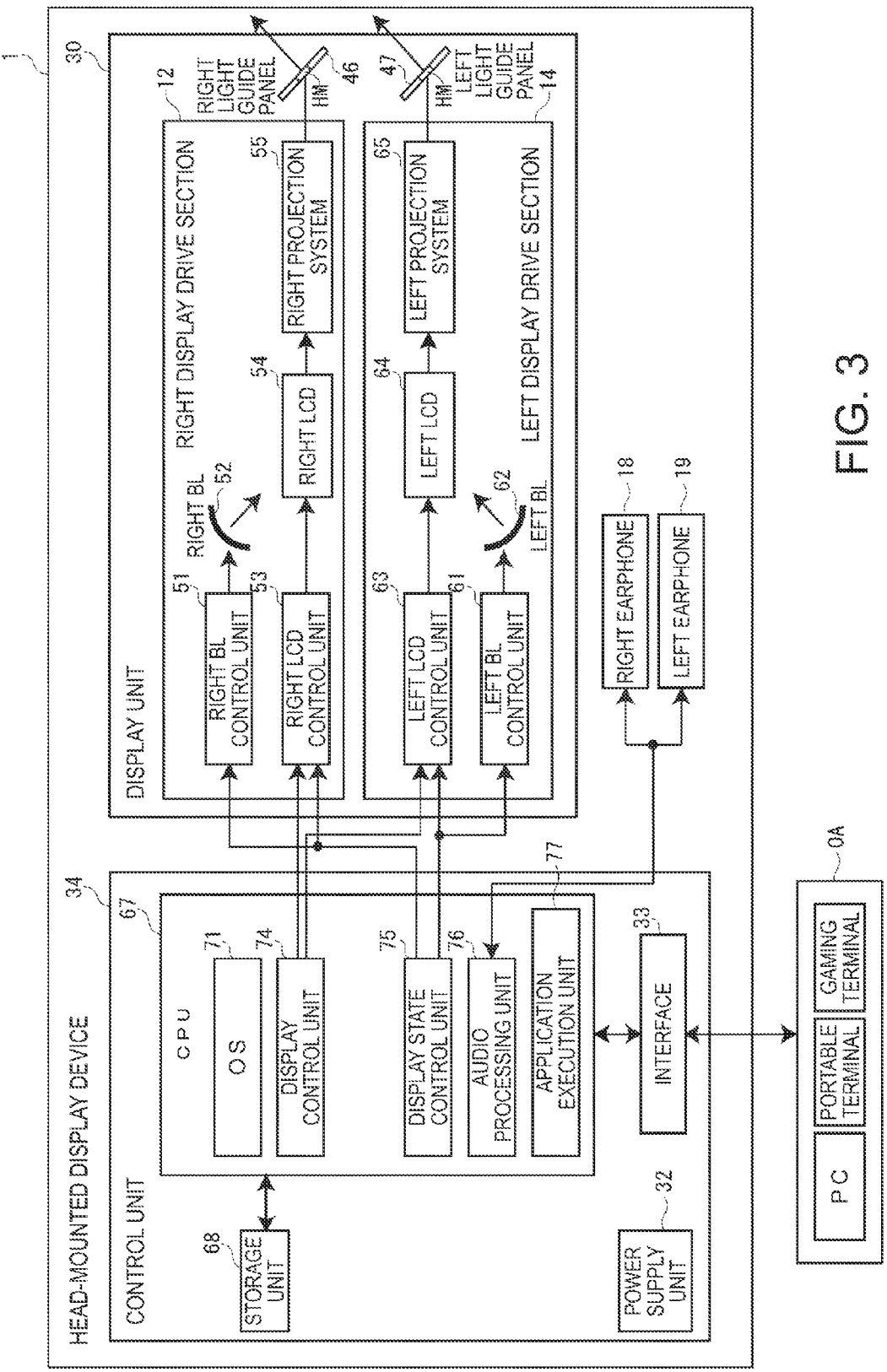
FIG. 3 is a block diagram illustrating the control configuration of the head-mounted display device.

Next, the control configuration of the head-mounted display device 1 will be described with reference to FIG. 3. As shown in FIG. 3, the head-mounted display device 1 includes a display unit 30 which makes the user visually recognize the virtual image 22, the right earphone 18, the left earphone 19, a power supply unit 32, an interface 33, and a control unit 34 which controls each of these units.

The power supply unit 32 supplies electric power to each part of the head-mounted display device 1. The interface 33 is for connecting various external devices OA which serve as sources of contents such as images (still images, dynamic images), sounds and the like. The external devices OA may include, for example, personal computer (PC), portable terminal (mobile phone, smartphone or the like), gaming terminal and the like. As the interface 33, for example, a USB interface, micro USB interface, memory card interface, wireless LAN interface or the like can be employed.

The display unit 30 includes the right display drive section (image light output unit) 12, the left display drive section (image light output unit) 14, a right light guide panel (light guide unit) 46 as the right optical image display section 15, and a left light guide panel (light guide unit) 47 as the left optical image display section 16.

The right display drive section 12 includes a right backlight (BL) control unit 51 and right backlight (BL) 52 which function as a light source, a right LCD (liquid crystal display) control unit 53 and right LCD 54 which function as a display element, and a right projection system 55.

The right backlight control unit 51 controls driving of the right backlight 52, based on an inputted control signal. The right backlight 52 is, for example, a light emitting body such as LED (light emitting diode) or electroluminescence (EL). The right LCD control unit 53 controls driving of the right LCD 54, based on inputted display data. The right LCD 54 is a transmission-type liquid crystal panel in which plural pixels are arranged in a matrix.

The right projection system 55 is configured to project (output) image light emitted from the right LCD 54 and uses, for example, a collimating lens. The right light guide panel 46 as the right optical image display section 15 is made of a light-transmitting resin material or the like and has a half mirror layer HM. The half mirror layer HM guides the image light outputted from the right projection system 55 to the user's right eye while reflecting the image light along a predetermined optical path. The right light guide panel 46 also transmits external light (light from the exterior 23) and causes the external light to become incident on the user's eye together with the image light. The half mirror layer HM forms the virtual image display area 27. Therefore, if the user's line of sight is within the virtual image display area 27, the user sees the half mirror layer HM and therefore sees the exterior 23 through the half mirror layer HM. Meanwhile, if the user's line of sight shifts out of the virtual image display area 27, the user sees a part that is not the half mirror layer HM of the right light guide panel 46 and therefore ends up seeing the exterior 23 through that part.

The left display drive section 14 includes a left backlight (BL) control unit 61, a left backlight (BL) 62, a left LCD control unit 63, a left LCD 64, and a left projection system 65, similarly to the right display drive section 12. The configuration and function of each element included in the left display drive section 14 are similar to those of each element included in the right display drive section 12 and therefore will not be described further in detail here. The left light guide panel 47 as the left optical image display section 16 is made of a light-transmitting resin material or the like and has a half mirror layer HM. The half mirror layer HM guides the image light outputted from the left projection system 65 to the user's left eye while reflecting the image light along a predetermined optical path. The left light guide panel 47 also transmits external light and causes the external light to become incident on the user's eye together with the image light. In the left light guide panel 47, the half mirror layer HM forms the virtual image display area 27, as in the right light guide panel 46.

As the image lights guided to the user's eyes in the head-mounted display device 1 thus form an image on the retinas, the user visually recognizes the virtual image 22 (display image screen 26) within the virtual image display area 27, for example, as shown in FIG. 2. Here, forming an image on the retina with the image light is referred to as "display" or "to display".

The control unit 34 has a CPU (central processing unit) 67 and a storage unit 68. The storage unit 68 includes a ROM (read only memory), RAM (random access memory) and the like and stores various computer programs. The CPU 67 reads out and executes the computer programs from the storage unit 68, thereby functioning as an operating system (OS) 71, a display control unit 74, a display state control unit 75, an audio processing unit 76, and an application execution unit 77.

The display control unit 74 generates display data and transmits the display data to the display unit 30 (right LCD control unit 53 and left LCD control unit 63). The display control unit 74 generates display data of the display image screen 26 where the plural icons 81 are arranged, and transmits this display data to the display unit 30. This causes the display unit 30 to display the display image screen 26 and to display the plural icons 81 on the display image screen 26. That is, in the head-mounted display device 1, the display control unit 74 generates the display data of the display image screen 26 and transmits the display data to the display unit 30 (display control process), and the display unit 30 displays the display image screen 26 including the plural icons 81 (forms an image on the retina with image light), based on the transmitted display data (display process).

The display state control unit 75 generates a control signal to control the right display drive section 12 and the left display drive section 14 and transmits the control signal to the display unit 30, thus controlling the image display state in the display unit 30. Specifically, the display state control unit 75 separately controls, with the control signal, ON/OFF of the driving of the right LCD 54 by the right LCD control unit 53, ON/OFF of the driving of the right backlight 52 by the right backlight control unit 51, ON/OFF of the driving of the left LCD 64 by the left LCD control unit 63, ON/OFF of the driving of the left backlight 62 by the left backlight control unit 61, and the like, and thus controls the generation and emission of the image light by each of the right display drive section 12 and the left display drive section 14.

The audio processing unit 76 transmits an audio signal to the right earphone 18 and the left earphone 19 and causes the right earphone 18 and the left earphone 19 to output the audio.

The application execution unit 77 executes each application according to the user's operation using the display image screen 26. Specifically, the icons 81 of the display image screen 26 are configured to be selectable (clickable) by a controller, not shown, and the application execution unit 77 accepts the selection of an icon 81 and executes (starts up) the application corresponding to the icon 81.

Figure 4:
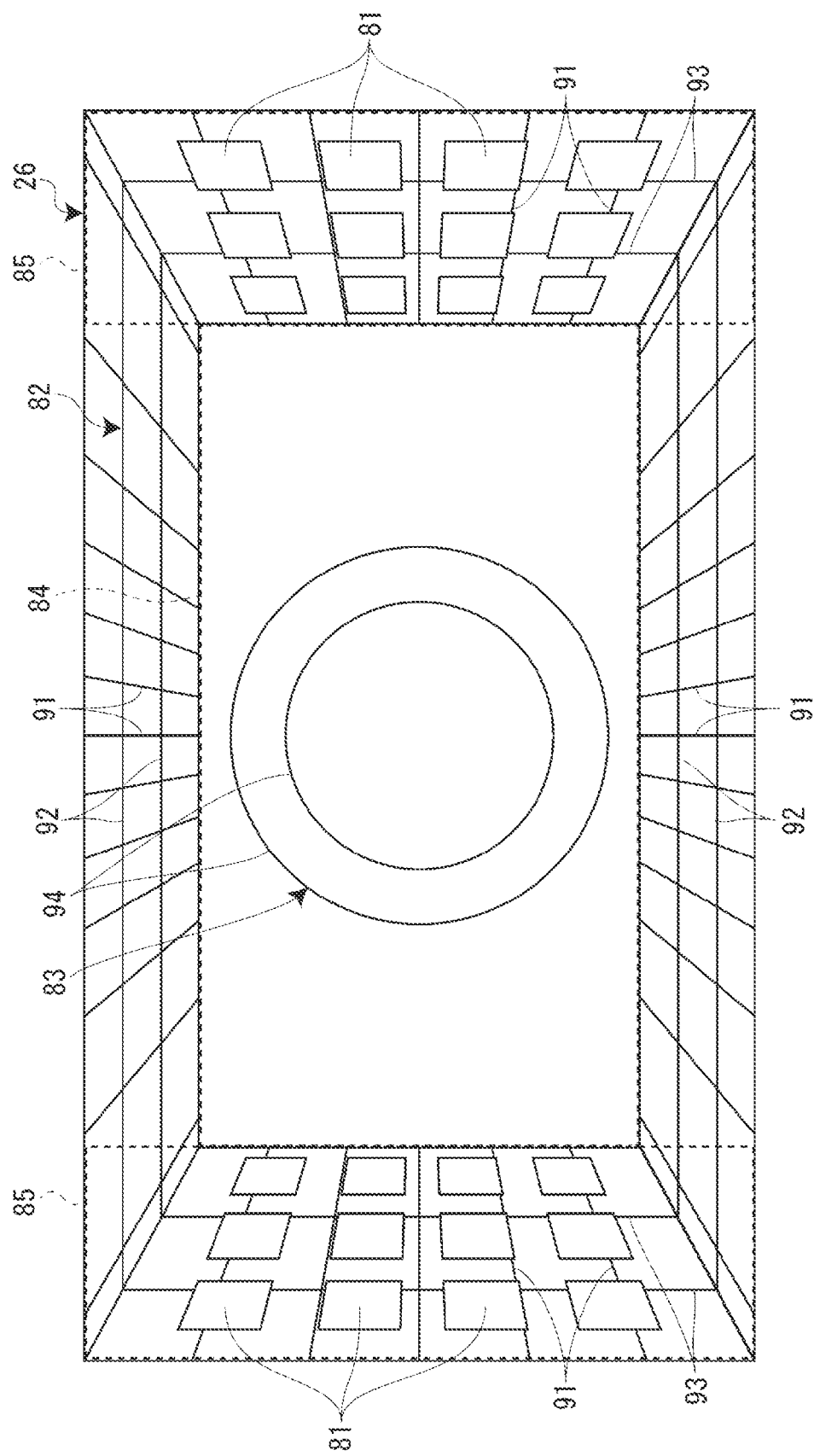
FIG. 4 illustrates a display image screen.

Next, the display image screen 26 of the head-mounted display device 1 will be described with reference to FIG. 4. The display image screen 26 is, for example, the home screen of the head-mounted display device 1. As shown in FIG. 4, the display image screen 26 includes plural icons (image objects) 81 arranged on the left and right in the display image screen 26, a perspective guide 82 formed in the entire area of the display image screen 26 except the center, and a double circle-like target 83 arranged at the center of the display image screen 26. Also, a vision securing area (predetermined area) 84 to view the exterior 23 is set in advance at the center of the display image screen 26. The background of the display image screen 26 is fully transmissive.

The plural icons 81 are arranged only in left and right escape areas 85 avoiding the vision securing area 84. The plural icons 81 are divided into two groups in the left and right escape areas 85 and arranged in the respective escape areas 85. As each icon 81, a rectangular icon image converted into a perspective image using the perspective method is arranged. Specifically, a rectangular icon image converted into a perspective image that has a vanishing point at the center of the display image screen 26 and faces inward to the vision securing area 84 (toward the vision securing area 84) is arranged. That is, a rectangular icon image provided with perspective is arranged. Thus, the rectangular icon images of the plural icons 81 are displayed as if these icons images were sticking to the left and right walls from a perspective point of view from the user.

The perspective guide 82 includes plural first guide lines 91 corresponding to vanishing lines to the vanishing point at the center of the display image screen 26, plural second guide lines 92 corresponding to horizontal lines, and plural third guide lines 93 corresponding to vertical lines. The plural first guide lines 91 extend toward the center from the outer edge side of the display image screen 26. Specifically, the plural first guide lines 91 extend from the outer edge of the display image screen 26 up to points short of the vision securing area 84, avoiding the vision securing area 84. The term "guide lines" mentioned in the appended claims is formed by the first guide lines 91.

The plural second guide lines 92 are arranged in top and bottom end parts of the display image screen 26, extending in left and right directions and avoiding the vision securing area 84. Meanwhile, the plural third guide lines 93 are arranged in left and right end parts of the display image screen 26, extending in up and down directions and avoiding the vision securing area 84. Therefore, in the top and bottom end parts of the display image screen 26, the first guide lines 91 and the second guide lines 92 form the top and bottom walls from a perspective point of view. Meanwhile, in the left and right end parts of the display image screen 26, the first guide lines 91 and the third guide lines 93 form the left and right walls from a perspective point of view. That is, the first guide lines 91, the second guide lines 92 and the third guide lines 93 form a room-like (box-like) shape without front and rear walls from a perspective point of view.

The target 83 includes two ring-shaped images 94 surrounding the center of the display image screen 26. The two ring-shaped images 94 are formed as concentric circles having different diameters and a center point at the center of the display image screen 26.

The plural icons 81, the perspective guide 82 and the target 83 as described above function as a guide image that restrains the shift of the user's line of sight out of the display image screen 26 and guides the line of sight to the center of the display image screen 26 (toward the center). Also, as the plural icons 81 and the perspective guide 82 are arranged avoiding the vision securing area 84, the field of vision 21 for the exterior 23 can be secured. That is, the GUI based on the display image screen 26 has both a vision securing function and a line of sight guiding function.

According to the configuration of this embodiment, since the guide image that guides the user's line of sight to the center of the display image screen 26 is displayed, the shift of the user's line of sight out of the display image screen 26 can be restrained to the utmost. That is, the user can be prompted (guided) to change the orientation of the body or the orientation of the head to shift the field of vision, instead of moving the eyes. This can prevent the uncomfortable feeling on the user's side and can eliminate a factor contributing to eye fatigue and sick feeling.

Also, since the plural icons 81 with perspective having a vanishing point at the center of the display image screen 26, the plural icons 81 for calling applications can be used to guide the user's line of sight. Also, the plural icons 81 generate a perspective optical illusion regarding the center as the back end and therefore can effectively guide the user's line of sight.

Moreover, by using the plural first guide lines 91 extending from the outer edge side toward the center are used, the user's line of sight can be guided effectively. Also, the perspective guide 82 generates a perspective optical illusion regarding the center as the back end and therefore can guide the user's line of sight more effectively.

Furthermore, by using the ring-shaped images 94 surrounding the center of the display image screen 26, the user's line of sight can be effectively guided.

Also, since the plural icons 81 and the perspective guide 82 are displayed avoiding the center area, the user's line of sight can be effectively guided. Moreover, since an area where the exterior 23 can be seen can be secured at the center of the field of vision 21, visibility of the exterior 23 can be improved.

Figure 5:
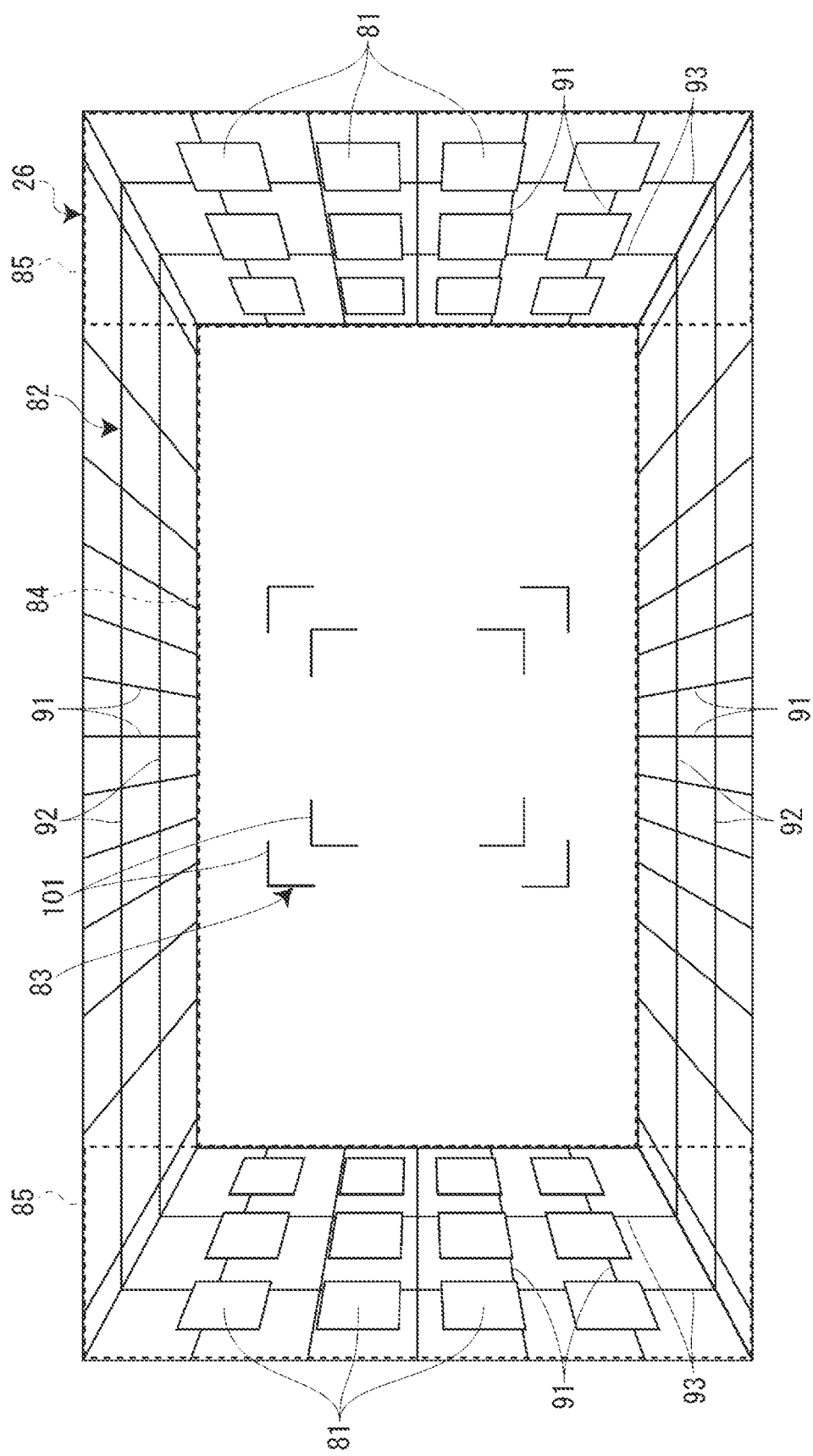
FIG. 5 illustrates a display image screen according to a first modification.

While the target 83 in the embodiment is formed by the ring-shaped images 94, the target 83 may also be formed by two frame-like images 101 surrounding the center of the display image screen 26, as shown in FIG. 5. Also, the target 83 may be formed by a single ring-shape image 94 or a single frame-like image 101.

Figure 6:
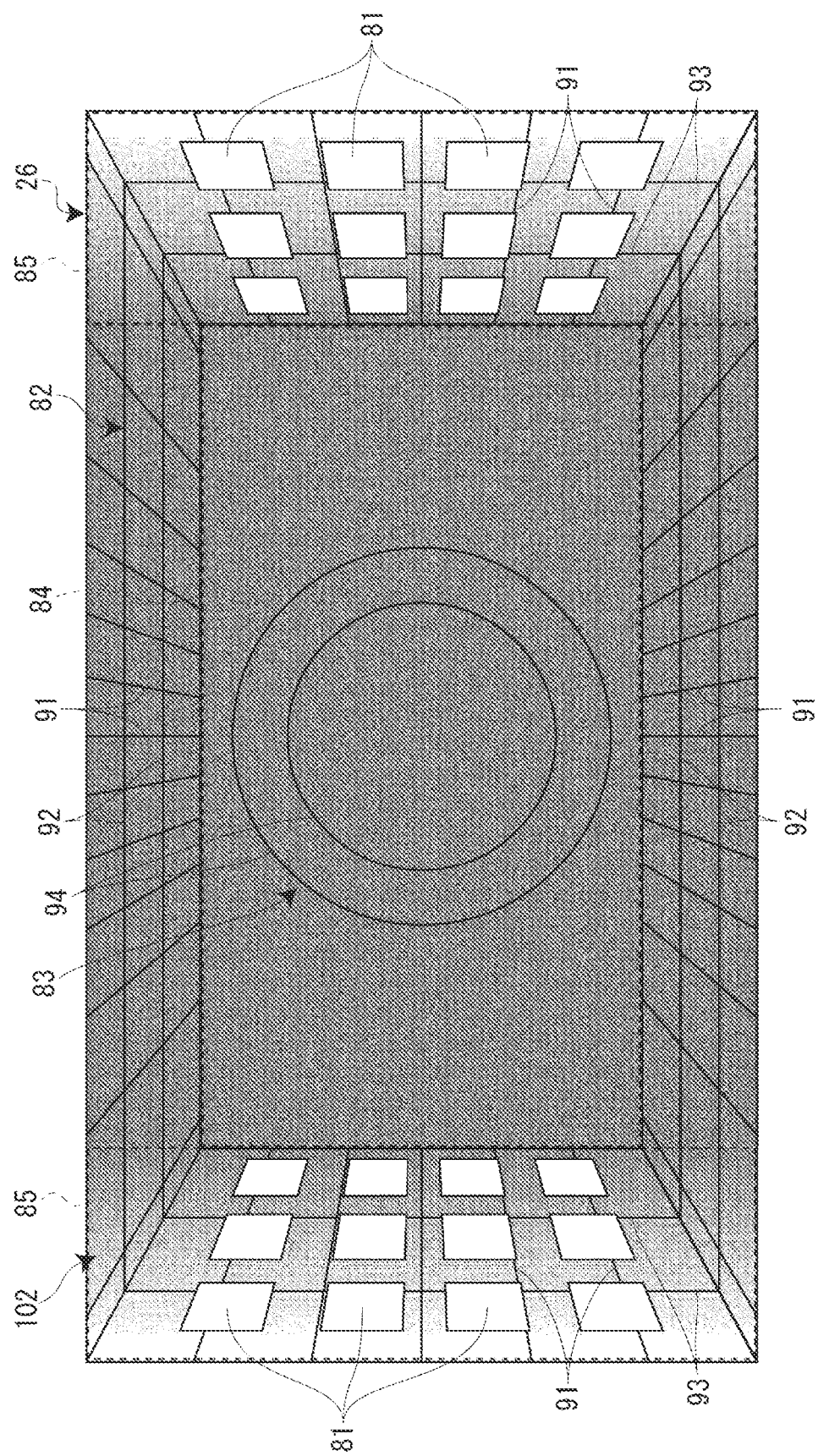
FIG. 6 illustrates a display image screen according to a second modification.

Also, in the embodiment, a gradation image 102 that becomes darker toward the center from the outer edge side of the display image screen 26 may be displayed as a guide image on the display image screen 26, as shown in FIG. 6. According to this configuration, the bright-dark gradation image 102 generates a perspective optical illusion regarding the center as the back end and therefore can effectively guide the user's line of sight.

Figure 7A:
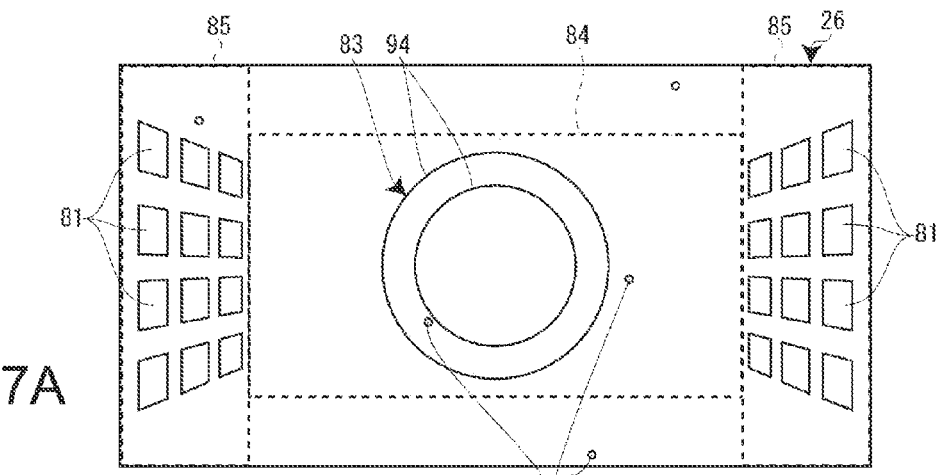
FIGS. 7A to 7C show image transition illustrating a display image screen according to a third modification.
Figure 7B:
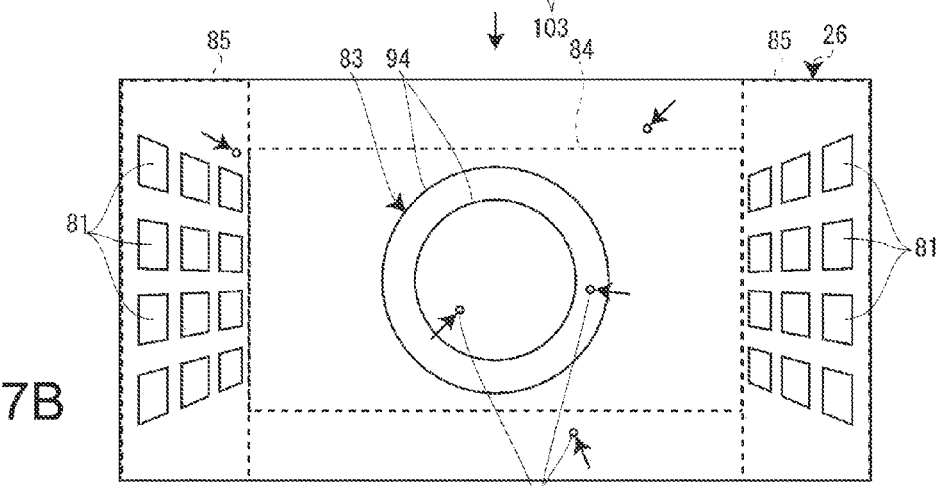
Figure 7C:
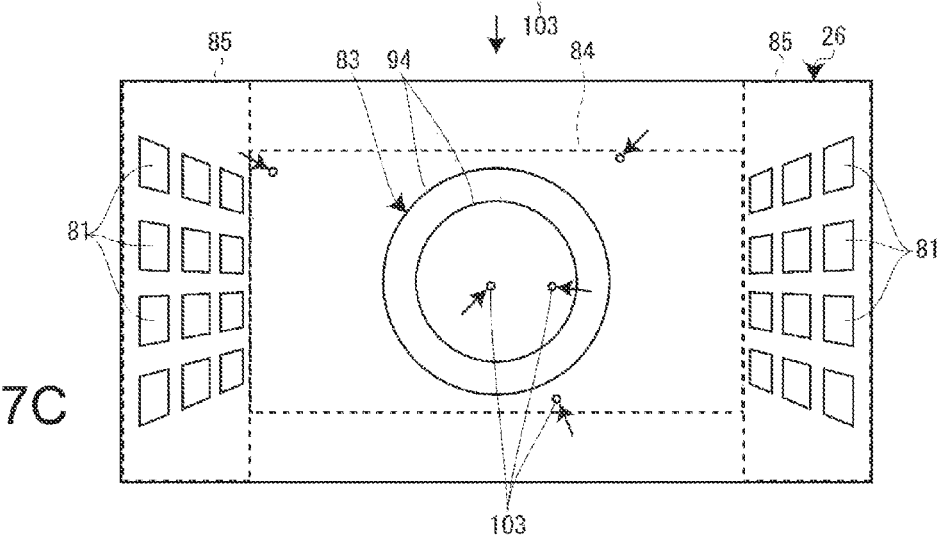

Moreover, in the embodiment, it is preferable that plural moving objects 103 moving toward the center from the outer edge side of the display image screen 26 are displayed as a guide image on the display image screen 26, as shown in FIGS. 7A to 7C. According to this configuration, the user's line of sight can be effectively guided by using the moving objects 103.

Furthermore, the guide image is not limited to the above examples as long as the guide image guides the user's line of sight to the center (toward the center of the display image screen 26 or to the center part of the display image screen 26). For example, in the case of displaying a text on the display image screen 26, the user's line of sight may be guided by adjusting the size of letters in the text. Also, it is possible to display only one type of the above guide images. In the case of displaying two or more types of the above guide images, the combination thereof is not limited to the above examples.

While the escape areas 85 in the embodiment are the left and right areas avoiding the vision securing area 84 (left and right escape areas), the escape areas 85 may be top and bottom areas avoiding the vision securing area 84 (top and bottom escape areas). Also, all the other areas than the vision securing area 84, of the virtual image display area 27, may be the escape areas 85.

Also, while the area at the center of the display image screen 26 (center of the user's field of vision 21) is the vision securing area 84 in the embodiment, this example is not limiting. For example, the bottom half of the display image screen 26 may be used as the vision securing area 84 in order to secure the field of vision at the user's feet, or the left or right half or the top half of the display image screen 26 may be used as the vision securing area 84. Also, the vision securing area 84 is not limited to a rectangular area and may be a circular or elliptic area.

Moreover, in the embodiment, the position of a predetermined real object (for example, an obstacle) in the user's field of vision may be detected and the arrangement of the plural icons 81 may be changed, based on this position. Specifically, the head-mounted display device 1 further includes an object detection unit which detects the position of a predetermined real object in the user's field of vision. If the predetermined real object is situated within the vision securing area 84 as a result of the detection by the object detection unit, the display control unit 74 causes the plural icons 81 to be displayed in the escape areas 85. If the predetermined real object is situated in the escape areas 85, the display control unit 74 causes the plural icons 81 to be displayed in the vision securing area 84.

While the plural icons 81 are displayed on the display image screen 26 in the embodiment, this example is not limited as long as an image object for calling applications is displayed on the display image screen 26. For example, as the image object, a menu representing each application or a reduced application window may be displayed on the display image screen 26.

Also, plural image objects for calling each file or each folder (for example, icons 81, shortcuts or the like) may be displayed on the display image screen 26, instead of the plural image objects for calling each application. Alternatively, image objects to carry out each user operation (for example, radio button, select button, soft keyboard or the like) may be displayed on the display image screen 26, instead of the plural image objects for calling each application. In such cases, too, each of the image objects is displayed as an image converted into a perspective image having a vanishing point at the center of the display image screen 26.

Moreover, in the embodiment, the head-mounted display device 1 may have a controller, not shown, and the controller may be equipped with a part or all of the display control unit 74, the display state control unit 75, the audio processing unit 76 and the application execution unit 77. In such a case, the controller may be wire-connected to the control unit 34 or the display unit 30 and the like (display unit 30, right earphone 18 and left earphone 19) via a cord or the like, or may be wirelessly connected to the control unit 34 or the display unit 30 and the like via wireless LAN, infrared communication, Bluetooth (trademark registered) or the like. The functions of the controller may also be realized by a personal computer (PC), a portable information terminal (PDA, mobile phone, watch-type portable terminal, smartphone) or the like.

Also, while the head-mounted display device 1 for both eyes (optical transmission-type head-mounted display device) is illustrated as an example of the display device in the embodiment, the invention may also be applied to, for example, other formats of head-mounted display device such as a single-eye type. Also, while the head-mounted display device 1 of a spectacles type covering the front of the eyes is illustrated, this example is not limited and the invention can also be applied to a head-mounted display device of a type that does not completely cover the front of the eyes (a type that partly covers the front of the eyes). Moreover, the invention can also be applied to other display devices than the head-mounted display device, such as head-up display.

Furthermore, while the image light output unit in the embodiment has the backlight control units (right backlight control unit 51 and left backlight control unit 61), the backlights (right backlight 52 and left backlight 62), the LCD control units (right LCD control unit 53 and left LCD control unit 63), and the LCDs (right LCD 54 and left LCD 64), this embodiment is simply an example. The image light output unit may have a component unit to realize a different method, in addition to or instead of these component units.

For example, the image light output unit may have an organic EL (organic electro-luminescence) display and an organic EL control unit. Alternatively, for example, the image light output unit may have an LCOS (liquid crystal on silicon; LCOS is a trademark registered) or digital micro mirror device or the like, instead of the LCDs.

Moreover, while the invention is applied to the so-called virtual image projection-type head-mounted display device 1 (head-mounted display) in the embodiment, the invention may also be applied to, for example, a laser retinal projection-type (so-called retinal scan-type) head-mounted display device.

Furthermore, while the image light output unit in the embodiment has the projection systems (right projection system 55 and left projection system 65) and is configured to project image light emitted from the LCDs, the image light output unit may have, for example, a scanning system including a MEMS mirror instead of the projection system and may have a signal light modulation unit (signal light forming unit) which emits signal light to the scanning system. In such a case, the signal light formed and emitted from the signal light modulation unit becomes incident on the scanning system (MEMS mirror) as a scanning unit. The scanning system emits the signal light as scanning light to a light guide member having a half mirror layer, and the scanning light is scanned on the surface of the half mirror layer, thus forming a virtual image with the image light. As the user's eyes catch this virtual image, the user can recognize the image.

Also, while the invention is applied to the head-mounted display device 1 in the embodiment, the invention may also be applied to a display system in which the head-mounted display device 1 and an external device OA or external server are connected to each other via a network. In such a case, the external device OA or external server side is equipped with a part or all of the display control unit 74, the display state control unit 75, the audio processing unit 76 and the application execution unit 77.

The entire disclosure of Japanese Patent Application No. 2013-158575, filed Jul. 31, 2013 is expressly incorporated by reference herein.

What is claimed is:

1. A transmission-type display device which makes a user visually recognize a display image screen as a virtual image, the device comprising:
    a display control unit which causes a guide image for guiding the user's line of sight to the center of the display image screen, to be displayed on the display image screen; and
    a display unit which displays the guide image,
    wherein
        the display control unit displays plural image objects, each of which calls an application when selected, as the guide image on the display image screen,
        the plural image objects are displayed on a right side and a left side of the display image screen, the right side and the left side being positioned away from a center of the display image screen, and the plural image objects are displayed as perspective images having a vanishing point at the center of the display image screen.

2. The display device according to claim 1, wherein the plural image objects are one of an icon, menu, and reduced application window.

3. The display device according to claim 1, wherein the display control unit causes plural guide lines extending toward the center from an outer edge side of the display image screen, to be displayed as the guide image on the display image screen.

4. The display device according to claim 1, wherein the display control unit causes one of a frame-like image surrounding the center of the display image screen and a ring-shaped image surrounding the center of the display image screen, to be displayed as the guide image on the display image screen.

5. The display device according to claim 1, wherein the display control unit causes a gradation image which becomes darker toward the center from an outer edge side of the display image screen, to be displayed as the guide image on the display image screen.

6. The display device according to claim 1, wherein the display control unit causes plural moving objects that move toward the center from an outer edge side of the display image screen, to be displayed as the guide image on the display image screen.

7. The display device according to claim 1, wherein the display control unit causes the guide image to be displayed, avoiding a predetermined area at the center of the display image screen.

8. The display device according to claim 1, wherein the display unit includes:
   an image light output unit which outputs image light; and
   a light guide unit which guides the outputted image light to the user's eyes, and
   the light guide unit transmits external light and causes the external light to become incident on the user's eyes together with the image light.

9. A transmission-type head-mounted display device which is mounted on a user's head and allows the user to visually recognize a display image screen as a virtual image, the device comprising:
   a display control unit which causes a guide image for guiding the user's line of sight to the center of the display image screen, to be displayed on the display image screen; and
   a display unit which displays the guide image,
   wherein
      the display control unit displays plural image objects, each of which calls an application when selected, as the guide image on the display image screen,
      the plural image objects are displayed on a right side and a left side of the display image screen, the right side and the left side being positioned away from a center of the display image screen, and
      the plural image objects are displayed as perspective images having a vanishing point at the center of the display image screen.

10. A transmission-type display system which allows a user to visually recognize a display image screen as a virtual image, the system comprising:
   a display control unit which causes a guide image for guiding the user's line of sight to the center of the display image screen, to be displayed on the display image screen; and
   a display unit which displays the guide image,
   wherein
      the display control unit displays plural image objects, each of which calls an application when selected, as the guide image on the display image screen,
      the plural image objects are displayed on a right side and a left side of the display image screen, the right side and the left side being positioned away from a center of the display image screen, and
      the plural image objects are displayed as perspective images having a vanishing point at the center of the display image screen.

11. A control method for a transmission-type display device which allows a user to visually recognize a display image screen as a virtual image, the method comprising:
   causing a guide image for guiding the user's line of sight to the center of the display image screen to be displayed on the display image screen; and
   displaying the guide image,
   wherein
      the guide image displayed on the display image screen comprises plural image objects, each of which calls an application when selected,
      the plural image objects are displayed on a right side and a left side of the display image screen, the right side and the left side being positioned away from a center of the display image screen, and
      the plural image objects are displayed as perspective images having a vanishing point at the center of the display image screen.

* * * * *